US009197316B1

(12) United States Patent
Hoffman et al.

(10) Patent No.: US 9,197,316 B1
(45) Date of Patent: *Nov. 24, 2015

(54) METHOD AND APPARATUS FOR TESTING EMERGENCY LOCATOR BEACONS INCORPORATING OVER THE AIR RESPONSES BACK TO THE EMERGENCY LOCATOR BEACON

(71) Applicants: Christopher Paul Hoffman, Fareham (GB); William Cox, Sunrise, FL (US); Thomas J. Pack, Boca Raton, FL (US)

(72) Inventors: Christopher Paul Hoffman, Fareham (GB); William Cox, Sunrise, FL (US); Thomas J. Pack, Boca Raton, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/959,829

(22) Filed: Aug. 6, 2013

Related U.S. Application Data

(63) Continuation-in-part of application No. 13/772,799, filed on Feb. 21, 2013, and a continuation-in-part of application No. 13/772,780, filed on Feb. 21, 2013.

(60) Provisional application No. 61/680,925, filed on Aug. 8, 2012.

(51) Int. Cl.
*H04B 3/36* (2006.01)
*H04B 7/185* (2006.01)

(52) U.S. Cl.
CPC .................................. *H04B 7/18519* (2013.01)

(58) Field of Classification Search
None
See application file for complete search history.

(56) References Cited

U.S. PATENT DOCUMENTS

| 5,497,149 | A | 3/1996 | Fast |
| 5,519,403 | A | 5/1996 | Bickley et al. |
| 5,914,675 | A | 6/1999 | Tognazzini |
| 5,987,377 | A | 11/1999 | Westerlage et al. |
| 6,285,281 | B1 | 9/2001 | Gatto |
| 6,771,163 | B2 | 8/2004 | Linnett et al. |
| 7,215,282 | B2 * | 5/2007 | Boling et al. ............ 342/357.31 |

(Continued)

OTHER PUBLICATIONS

Todd Hara, ORBCOMM PCS Available Now!, Military Communications Conference, 1995. MILCOM '95, Conference Record, IEEE, 1995, pp. 874-878, vol. 2, IEEE, USA.

(Continued)

*Primary Examiner* — Fayyaz Alam
(74) *Attorney, Agent, or Firm* — Malin Haley DiMaggio & Bowen, P.A.

(57) ABSTRACT

An emergency locator beacon device that includes sending a test signal from a first satellite transmitter of the device to a Cospas-Sarsat emergency monitoring service; receiving from a beacon testing service a test confirmation signal corresponding to the test signal, the confirmation signal being received on a second satellite receiver of the beacon; wherein the emergency monitoring service and the beacon testing service are in communication over the Internet. The first satellite transmitter comprises a 406 MHz emergency transmitter configured to communicate with a Cospas-Sarsat satellite system. The second satellite receiver comprises a SEND receiver configured to communicate with a commercial satellite system. The emergency monitoring service is in communication with a rescue coordination center and the rescue coordination center is further in communication with the beacon testing service by way of the Internet. The test signal includes a beacon identification number which is pre-registered with the beacon testing service.

1 Claim, 2 Drawing Sheets

(56) References Cited

U.S. PATENT DOCUMENTS

| | | | |
|---|---|---|---|
| 7,675,423 B2 * | 3/2010 | Boling et al. | 340/573.1 |
| 7,830,305 B2 | 11/2010 | Boling et al. | |
| 7,991,380 B2 | 8/2011 | Collins et al. | |
| 8,018,332 B2 * | 9/2011 | Boling et al. | 340/539.1 |
| 8,098,190 B2 | 1/2012 | Bishop et al. | |
| 8,306,482 B2 * | 11/2012 | Lee et al. | 455/90.1 |
| 2004/0111195 A1 | 6/2004 | Vries et al. | |
| 2006/0007038 A1 * | 1/2006 | Boling et al. | 342/357.1 |
| 2006/0200842 A1 | 9/2006 | Chapman et al. | |
| 2007/0057798 A1 | 3/2007 | Li et al. | |
| 2008/0186135 A1 * | 8/2008 | Boling et al. | 340/7.51 |
| 2008/0191863 A1 * | 8/2008 | Boling et al. | 340/521 |
| 2008/0261556 A1 * | 10/2008 | McLellan | 455/404.2 |
| 2009/0156139 A1 * | 6/2009 | Lee et al. | 455/90.1 |
| 2010/0271198 A1 | 10/2010 | Boling et al. | |

OTHER PUBLICATIONS

Motorola, Inc., Satellite Series 9505 Portable Telephone User's Guide, 1999, Motorola, Inc., USA.

* cited by examiner

METHOD AND APPARATUS FOR TESTING EMERGENCY LOCATOR BEACONS INCORPORATING OVER THE AIR RESPONSES BACK TO THE EMERGENCY LOCATOR BEACON

CROSS REFERENCE TO RELATED APPLICATIONS

This application is a continuation-in-part of U.S. patent application Ser. No. 13/772,799 filed on Feb. 21, 2013. This application is also a continuation-in-part of U.S. patent application Ser. No. 13/772,780 filed on Feb. 21, 2013. This application claims the benefit of U.S. Provisional Application No. 61/680,925, filed Aug. 8, 2012.

BACKGROUND OF THE INVENTION

1. Field of the Invention

The present invention relates to emergency locator and communication beacons and more specifically to a method and apparatus for testing emergency locator beacons incorporating over the air responses back to the emergency locator beacon.

2. Description of Related Art

The Cospas-Sarsat international satellite system has been operational for many years and is well known. Its sole purpose is to provide emergency distress alerting capability from an aircraft, vessel or individual in distress to relevant emergency services, via a one way satellite communications network. The system employs three types of emergency locator beacons known as Emergency Locator Transmitters (ELTs), Emergency Position Indicating Radio Beacons (EPIRBs) and Personal Locator Beacons (PLBs) all operating in the 406.0 to 406.1 MHz frequency band. Each of these beacons transmits a digital message containing among other things the unique identity of each beacon. The format of this digital message is defined in international standards and is comprised of a number of different data fields, each of which contains different data depending on the particular message format of which there are a number to address differing administrations and equipment requirements.

The Cospas-Sarsat system is unique in that it is truly global and is run by various governments for the benefit of all. The system sends an emergency distress alert directly to the relevant government authority responsible for rescue efforts (e.g. U.S. Coastguard) around the world. The Cospas-Sarsat system provides a one way communications link between a beacon and one or more Cospas-Sarsat satellites. The Cospas-Sarsat satellites are in communication with one or more dispatchers who are responsible for routing a distress signal from a beacon to the appropriate first responders who carry out the rescue efforts. Specifically, the Cospas-Sarsat satellites receive a distress signal and route the data to one or more receiving and processing stations called LUTs, or local user terminals. The LUTs generate distress alert data which is then communicated to a Mission Control Center (MCC) whereby the MCC then routes instructions and information to localized Rescue Coordination Centers (RCC). The RCCs are then responsible for facilitating the coordination of the rescue efforts. While the Cospas-Sarsat system is effective, it is limited in that it only provides for one way communication, i.e. from the beacon to the responders, which can result in the omission of vital information necessary to aid the rescue effort for the person(s) in distress as well as for the responders.

More recently, commercial satellite communication systems utilizing both one way (remote user to satellite ground station only (e.g. Globalstar SPOT) or satellite ground station to remote user only (e.g. Sirius XM radio)) and two way communications have become more common and have started to be used for both emergency distress alerting and general day to day communications. These satellite communication systems are particularly useful in locations where cellular telephone antennas cannot be placed and/or where cellular telephone reception is low or non-existent. Satellite communications systems have been tailored for emergency communications through the adoption and use of Satellite Emergency Notification Devices (SENDs). Globalstar SPOT is one example of a one way version of such a device and the DeLorme InReach device is one example of a two way version of such a device. Typically, a satellite communication system operates by creating a one-way or two-way communications link between a satellite telephone or SEND and a commercial communications satellite. The commercial communications satellite may comprise the Iridium satellite system already established in the art. The communications satellite is further in communication with a satellite gateway whereby the gateway is in communication with one or more computer servers. The computer servers typically have connects to the internet, cellular telephone systems, or standard land-line telephone systems thereby allowing the satellite phone or SEND user to communicate with a plurality of other devices by way of a plurality of communications systems. In some instances, the computer servers may be in communication with a particularized commercial emergency response call center that carries out specific emergency rescue operations should the satellite phone or SEND use request them or by the pressing of an "emergency" key on his device.

There are several advantages of SEND devices compared to 406 MHz beacons in that SEND devices permit communications other than pure emergency distress alerting and thus can be used on a regular basis to remain in two way communication even when outside of an area of cellular phone coverage. In addition, SEND devices can be used to track and report on the location of the remote person as well through the use of internal GPS receivers typically found in SEND devices. In addition, because SENDs and satellite telephones permit two-way communications, in an emergency situation some of the satellite devices can provide to the user additional information on the emergency and rescue efforts and some can even permit communication with the person in distress by voice, data, or text message.

However, SEND devices also suffer from some disadvantages compared to 406 MHz beacons in that SEND devices currently have to forward distress alerts to a commercial emergency call center (e.g. a 911 call center) and this call center then has to communicate with the relevant emergency services. It is then difficult for the relevant emergency services to communicate backwards and forwards with the person in distress because the system is not cohesively and centrally established for emergency and rescue efforts.

Further still, while both the 406 MHz beacons and SEND systems have built in redundancy to allow for outages in parts of the system, each system is still dependent upon a single communications system that may break down or become unreliable in what can often be a life threatening situation.

Referring to FIG. 1, an improved system is shown which is a combination of a 406 MHz beacon transmitter system and a SEND system, referred to as a 406-SEND system. Such a system combines the radio frequency emergency alerting benefits of the Cospas-Sarsat system and the two-way communications benefits of a satellite-based SEND system. This combination provides a world class distress alerting system over the Cospas-Sarsat network together with both a secondary means of distress alerting over commercial satellite systems, permitting government agencies to communicate with the person in distress as well as receive robust emergency distress signals. The functionality of this combined system is described and claimed in U.S. patent application Ser. Nos. 13/772,799 and 13/772,780 to which the present application claims priority and of which are incorporated by reference in their entireties herein.

All of these devices require testing in order to assure proper operation. In fact, the U.S. Coast Guard has rules requiring mandatory testing of EPRIB's on a monthly basis. As described in Applicant's U.S. Pat. No. 8,098,190, which is incorporated by reference herein, there are currently four main groups offering beacon testing services: TSI, Inc., government entities such as the U.S. Coast Guard and the Canadian government, various entities using beacon testing equipment manufactured by A.R.G. ElectroDesign LTD and WS technologies, and a number of small test shops/manufacturers to which beacon owners must return a beacon unit for testing. Of these groups, TSI, Inc. and the Canadian government provide "over the air" (OTA) testing, that is, testing to verify that the beacon unit is properly transmitting a signal when activated. FCC regulations have limited consumer testing of emergency locator beacons to self-testing or to the use of a beacon tester. "Live" testing through the Cospas-Sarsat Satellite system has been strictly prohibited.

However, as described in the aforementioned patent, a system and method have been provided which allow local testing and OTA testing through the Cospas-Sarsat Satellite system. In that system, a test is initiated from a beacon which test signal is received by a beacon test device, which test device transmits a signal over the Cospas-Sarsat signal network. Once the test signal is confirmed, the beacon tester sends data over the internet to a beacon information processor. Eventually, a test confirmation message is sent back to the user by way of an e-mail or a website that is accessed by the user independently from the emergency beacon.

Thus, while an improved system and method of testing emergency beacons have been provided, the system and method require independent verification of the test results discrete from the beacon itself. Such a system does not allow the user to test the beacon in a location where an internet connection or other communications network connection is not available, for example on the high seas. Accordingly, there is a need in the art for an enhanced emergency beacon testing apparatus and method which allow for over-the-air test confirmation responses to be sent back directly to the emergency locator beacon. Such a system and method provide the ability to test the emergency beacon and receive a test confirmation directly on the beacon itself, allowing for test confirmation without the need for an external communications network.

It is, therefore, to the effective resolution of the aforementioned problems and shortcomings of the prior art that the present invention is directed. However, in view of the emergency beacons and related systems in existence at the time of the present invention, it was not obvious to those persons of ordinary skill in the pertinent art as to how the identified needs could be fulfilled in an advantageous manner.

SUMMARY OF THE INVENTION

A method for testing an emergency locator 406 MHz beacon device used with Cospas-Sarsat network comprising the steps of: 1) sending a test signal from a first satellite transmitter of the device to an emergency monitoring service; 2) receiving from a beacon testing service a test confirmation signal corresponding to the test signal, the confirmation signal received on a second satellite receiver of the beacon; wherein the emergency monitoring service and the beacon testing service are in communication over the Internet. The first satellite transmitter comprises a 406 MHz emergency transmitter configured to communicate with a Cospas-Sarsat satellite system. The second satellite receiver comprises a SEND receiver configured to communicate with a commercial satellite system. The emergency monitoring service is in communication with a rescue coordination center and the rescue coordination center is further in communication with the beacon testing service by way of the Internet. The test signal includes a beacon identification number which is pre-registered with the beacon testing service.

Accordingly, it is an object of the present invention to provide a method and systems for testing a 406 MHz Cospas-Sarsat emergency locator beacon by sending a test signal from the beacon using a first communication protocol and receiving confirmation of the test signal on the beacon using a second communication protocol.

It is another object of the present invention to send a test signal from an emergency locator device over a transmit-only protocol and receive a test signal confirmation back on the same device by a transmit and receive protocol.

It is yet another object of the present invention to provide a method and system to test an emergency locator device directly on the device from any location, without the need for an external device or external Internet or other communications connection.

In accordance with these and other objects which will become apparent hereinafter, the instant invention will now be described with particular reference to the accompanying drawings.

DESCRIPTION OF THE INVENTION

Figure 1:
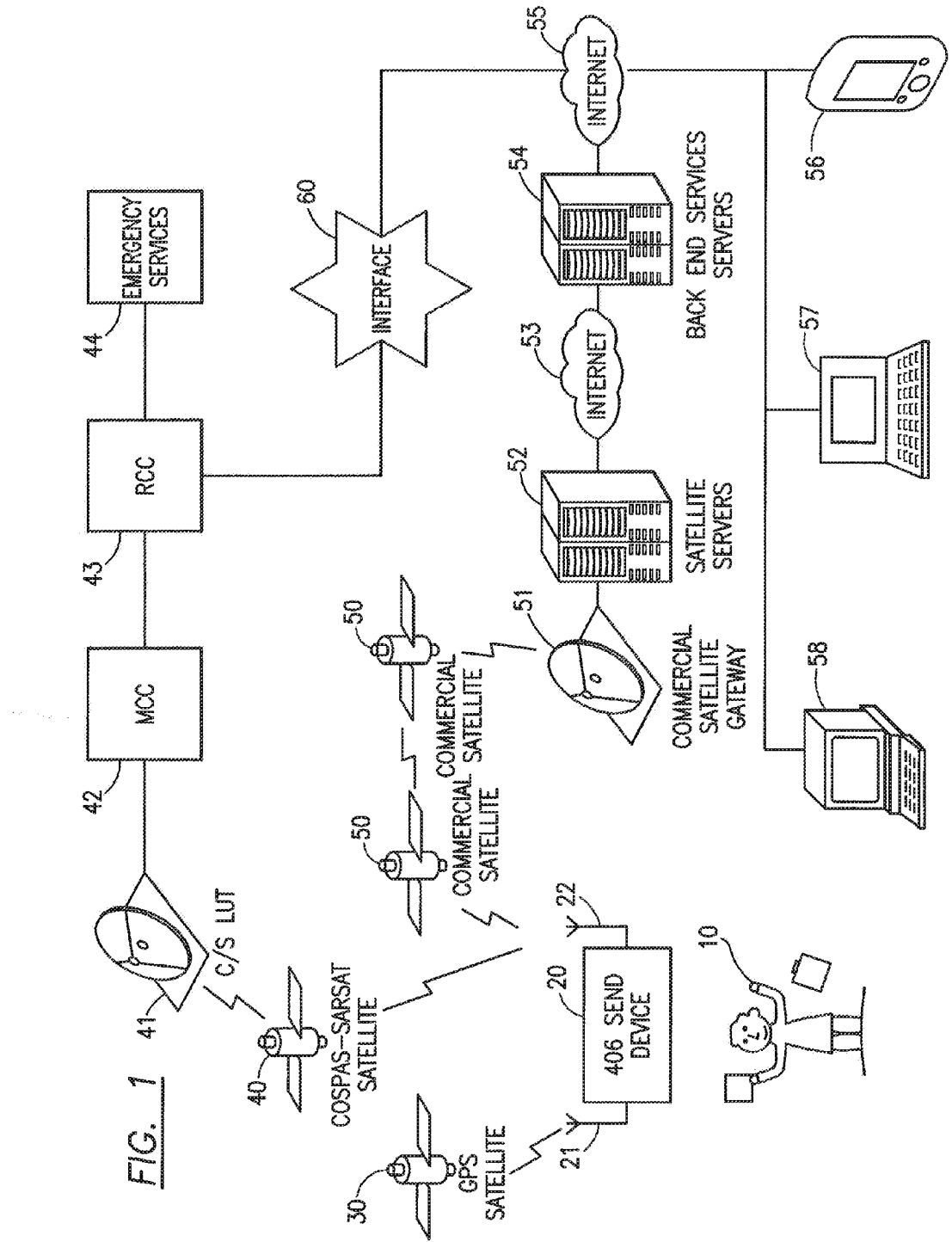
FIG. 1 is a schematic diagram of one embodiment of a combined 406-SEND emergency communications system.

With reference to FIG. 1, shown is a schematic of one embodiment of the system and method of the present invention. User 10 is a person who operates 406-SEND Device 20. Device 20 may be referred to herein interchangeably as a beacon and/or emergency locator beacon. User 10 may be a person requiring rescue or may simply be a person desirous of communicating via his device 20.

The 406-SEND device 20 includes one or more transmitter/receivers 21 and 22. In some embodiments, receiver 21 is a global positioning system (GPS) receiver that is capable of receiving location information from one or more GPS satellites 30. In some embodiments, transmitter/receiver 22 is a dual-purpose transmitter/receiver configured to simultaneously and/or selectively transmit over the 406 MHz Cospas-Sarsat system and transmit and receive over a commercial satellite communications system. It is appreciated that where the Cospas-Sarsat system is only a one-way communication system (transmitter of 406 MHz signal), the transmitter/receiver 22 is configured for that one-way communication. Further, transmitter/receiver 22 is configured for two-way communication by way of a commercial satellite system. In some embodiments, the 406-SEND device 20 includes identifiers embedded in the transmitter/receivers 21 and 22 such that the identity of the 406-SEND device 20 can be determined. It is appreciated that the transmitter/receiver 22 may comprise a 406 MHz transmitter and a SEND transmitter both capable of communicating simultaneous in accordance with the system shown in FIG. 1.

406-SEND device 20 is configured to selectively communicate by way of transmitter/receiver 22 to one or more Cospas-Sarsat satellites 40 and one or more commercial satellites 50. Accordingly, in some embodiments, 406-SEND device 20 is in communication with Cospas-Sarsat satellite 40 which is in turn in communication with one or more local user terminals (LUT) 41. A user 10 may generate and transmit 406 MHz distress signal on his 406-SEND device 20 which signal is then relayed first to the Cospas-Sarsat satellite 40 and then to the LUT 41. The LUT 41 is then capable of generating distress alert data which is then communicated to a Mission Control Center (MCC) 42 whereby the MCC 42 then routes instructions and information to one or more localized Rescue Coordination Centers (RCC) 43. The RCCs 43 are then responsible for facilitating the coordination of the rescue efforts and, in some embodiments, are in communication with local emergency services 44 who carry out the actual rescue.

In some embodiments, the 406-SEND device 20 is in communication with one or more commercial satellites 50 which are tasked with relaying various satellite telephone communications. In some embodiments, the one or more commercial satellites 50 are in communication with a commercial satellite gateway 51 which functions as a relay point between the ground services (discussed herein) and the satellites 50. The "ground services" comprise a series of interconnected computer systems including one or more satellite servers 52 which may be in communication with the Internet 53 and further in communication with one or more back end services servers 54 which may also be in communication with the Internet 55. The back end services servers 54 are capable of communicating with a plurality of devices which allow two-way communication between those devices and the 406-SEND device 20 in the field. In some embodiments, these devices include: a cellular telephone 56 for voice, data, and text services; a personal computing device 57 such as a laptop, desktop, or mobile device for voice, data, and text (e-mail) services; and a 406-SEND-specific user interface device 58 for voice, data, and text services. The foregoing commercial satellite configuration allows for the establishment of a bi-directional communications link between one or more 406-SEND devices 20 and one or more other devices such as the aforementioned personal computer, mobile device, cellular telephone, or 406-SEND interface.

To further enhance the reliability and usefulness of the system and method of the present invention, an interface 60 is provided to establish a communications link between the back end services server 54 of the commercial satellite system and the one or more RCCs 43. In some embodiments, the back end services server 54 utilizes its internet connection 55 to communicate with RCC 43 over interface 60. In some embodiments, the interface 60 may be configured to bypass the MCC 42 and RCC 43 to be in direct communication with the C/S LUT 41. The interface 60 is a specialized and critical component which allows the Cospas-Sarsat system to communicate directly with the commercial satellite system in order to provide a more robust, complete, and integrated set of communications and emergency services. In some embodiments, interface 60 may comprise an automated communications interface that is established as a joint effort by both the Cospas-Sarsat system and the commercial satellite system. In other embodiments, interface 60 may comprise a discrete third-party service provider whose primary function is to facilitate communications between the Cospas-Sarsat system and the commercial satellite system. Accordingly, interface 60 may comprise either a passive communications link or an active communications link between the Cospas-Sarsat system and the commercial satellite (SEND) system. In some embodiments, the "active" link comprises a service provider employing one or more computer networks to provide a robust set of communications services. In some embodiments, interface 60 functions as an interface to expand the one-way communications capabilities of the already-established Cospas-Sarsat system to allow for two-way communication thereof by way of the commercial satellite (SEND) system.

With respect to testing, the above system provides a substantial advantage of the prior art because testing confirmation messages can be sent back to the user's 406-SEND device regardless of where the device is located and without the need for the user to have access to e-mail or a website to receive such confirmation messages.

Figure 2:
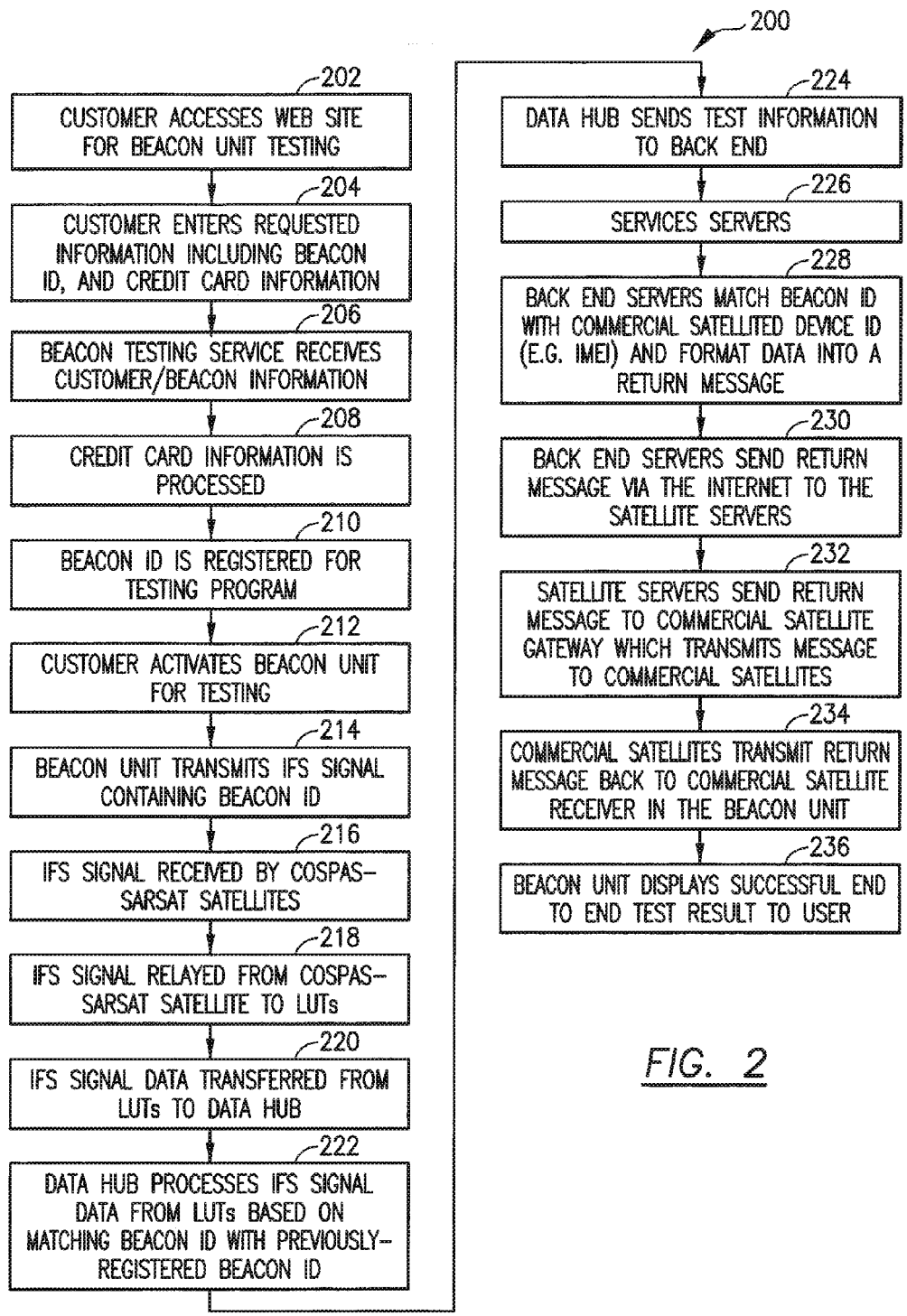
FIG. 2 is a block diagram describing one embodiment of the method of the present invention.

With reference to FIG. 2, one aspect of the present testing method 200 is described. In some embodiments, the method in FIG. 2 is carried out over an embodiment of the system shown in FIG. 1, i.e. a dual-band system that allows for bi-directional communication between a 406-SEND device 20 and a plurality of other devices and service providers. As shown in FIG. 2, in order to establish the ability to test a 406-SEND device, the user must first register the device 20 with a beacon testing service, i.e. the Back End Services provider 54 described above. The customer can utilize a website step 202 and step 204 or interface directly with the beacon testing services 206 and provides the beacon testing service 206 with at least a Beacon Identification Number corresponding to the 406 transmitter of the user's 406-SEND device 20. In some embodiments, the customer may also provide the beacon testing service with the identification number of the SEND transmitter/receiver of the user's device. The customer may also provide the beacon testing service with payment information, such as a credit card 208. At this point, the beacon testing service registers the user's beacon device 20 with their system after which testing can be initiated 210. At some point, the customer activates the "test" function of his 406-SEND device 20 at 212. The "test" function may be activated anywhere, regardless of where the user may be located, including in remote areas where no other internet or communication means is available. In some embodiments, the test function is a user selectable function provided directly on the 406-SEND device 20.

Upon activation of the test function, the 406-SEND device 20 sends out an IFS signal which includes a test signal and the Beacon Identification Number at 214. The IFS signal is sent utilizing the 406 transmitter of the beacon and is therefore received by the Cospas-Sarsat Satellite. The IFS signal is then relayed to the LUT or LUTs, which is in some embodiments operated by a private monitoring service at 218. The LUT then transmits the IFS signal to a data hub, which data hub processes the IFS signal and matches the beacon ID with the previously registered beacon ID at 220 and at 222. In some embodiments, the data hub may comprise the Rescue Coordination Center (RCC). It is appreciated that the data hub is capable of understanding that the IFS signal is a test signal and is not indicative of an actual emergency. This prevents the data hub from wasting resources in responding to an event that is not a rescue emergency. The Data Hub then sends test information relevant to the IFS signal to the Back End Services servers 226 by way of the Internet at 224. The Back End Services, i.e. the beacon testing service, then matches up the beacon identification number contained in the test information with the pre-stored SEND transmitter/receiver identification number of the user's 406-SEND device at 228. Typically, the SEND transmitter/receiver identification number is established as an International Mobile Equipment Identity (IMEI) number or the like. The back end service then formats data pertaining to the testing information into a return message to be sent back to the user's 406-SEND device at 230 using the system described above and shown in FIG. 1.

The return message is relayed from the back end services to the commercial satellite servers at 232 by way of the Internet and the commercial servers send the message to its satellite gateways which in turn transmit the return message back to the user's 406-SEND device 20 by way of the commercial satellites at 234 and 236. It is appreciated that the return message is received by way of the user's SEND transmitter/receiver. In some embodiments, the return message can be then displayed on a display of the 406-SEND device 20 or may be signaled by way of an LED or other indicator on the 406-SEND device 20.

The present invention provides a method and system for a 406 MHz beacon system test signal to be generated by the user from the beacon, whereby the user receives a return test message in SEND format directly to the 406 Device that the device is operating correctly. This allows the user to receive the return message, i.e. test confirmation, directly on his 406-SEND device without the need for an external interface, computer, or separate internet or other communications network connection. Thus, the user can test the 406-SEND device from any location, including those locations where only satellite-based SEND communication is available.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for testing a 406 MHz emergency locator beacon:

accessing a website for testing said beacon;

registering said beacon by entering requested information on said website, including a beacon identification number (ID) and payment information;

receiving, at said beacon testing service, said requested information;

processing, at said beacon testing service, a payment corresponding to said payment information;

registering said beacon identification number for a testing program activating said beacon for testing transmitting, from said beacon, a signal containing said beacon identification number;

receiving, on a Cospas-Sarsat satellite, said signal containing said beacon identification number;

relaying said signal from said Cospas-Sarsat satellite to a Local User Terminal (LUT);

transferring said signal from said LUT to a Data Hub;

processing, at said Data Hub, said signal by matching said received beacon identification number with said requested information;

sending test information from said Data Hub to a back end service provider server;

matching, by way of said back end service provider server, said beacon identification number with an International Mobile Equipment Identity number of said beacon;

sending, by way of the Internet, a return message from said back end service provider server to a satellite server;

transmitting said return message from said satellite server to a commercial satellite by way of a commercial satellite gateway;

transmitting said return message to said beacon by way of said commercial satellite; and providing, on said beacon, a successful test result.

* * * * *